June 4, 1963   W. D. HORSLEY   3,092,741
DYNAMO-ELECTRIC MACHINERY
Filed July 5, 1957   3 Sheets-Sheet 1
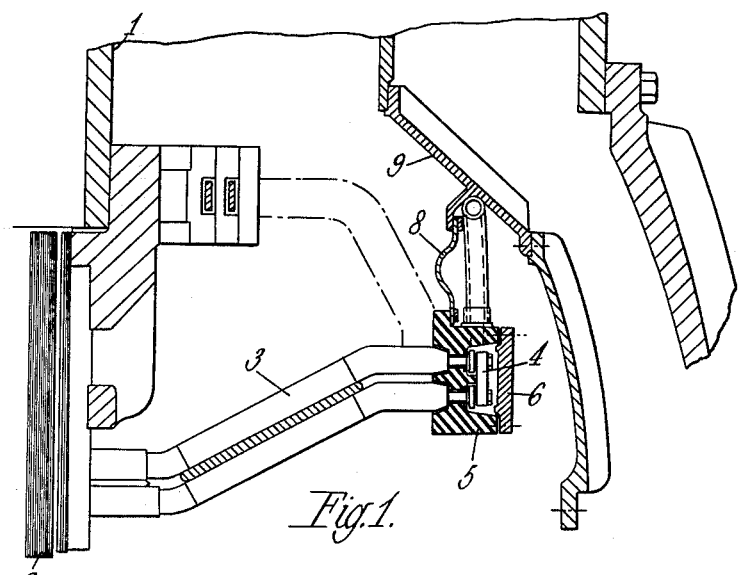
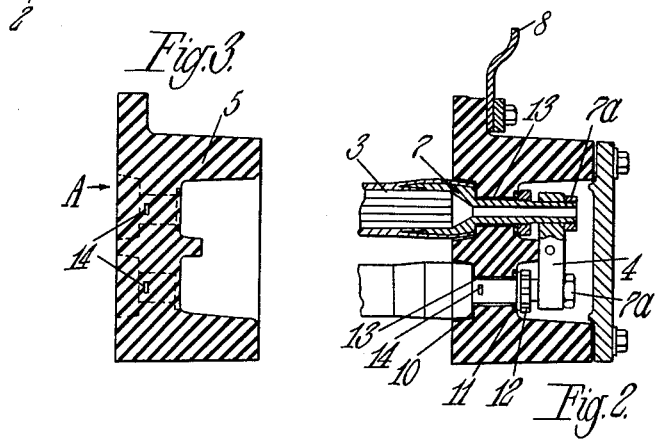
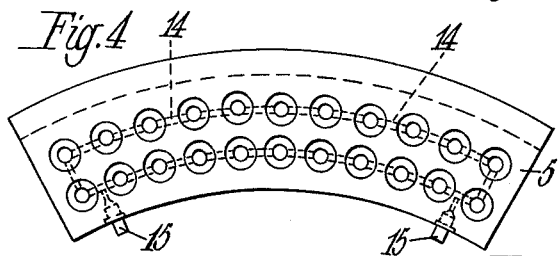
Inventor
W.D.Horsley June 4, 1963 W. D. HORSLEY 3,092,741
DYNAMO-ELECTRIC MACHINERY
Filed July 5, 1957 3 Sheets-Sheet 2

Inventor
W.D.Horsley

Inventor
W.D. Horsley

United States Patent Office 3,092,741
Patented June 4, 1963

3,092,741
DYNAMO-ELECTRIC MACHINERY
William D. Horsley, Newcastle-upon-Tyne, England, assignor to C. A. Parsons & Company Limited, Newcastle-upon-Tyne, England
Filed July 5, 1957, Ser. No. 670,043
Claims priority, application Great Britain July 6, 1956
6 Claims. (Cl. 310—54)

This invention relates to dynamo-electric machines particularly turbo-generators.

It is well known that one of the main factors limiting the output of a large dynamo-electric machine such as a turbo-generator is the rise in temperature caused by ohmic losses resulting from the flow of current through the conductors constituting the windings of the machine.

One method of removing part of this heat is to bring a cooling fluid into direct contact with the conductors and this may be achieved by using hollow conductors through which the cooling fluid flows.

One of the problems associated with this type of cooling is that of feeding the cooling fluid into or around the conductors at entry and collecting said fluid at the discharge end of a winding.

The object of the present invention is to provide a stationary winding of a dynamo-electric machine with improved means for introducing into and collecting a cooling fluid therefrom.

According to the invention the stationary winding of a dynamo-electric machine comprises conductors housed in slots in a stator core, end portions of the conductors extending beyond said core at each end thereof, said end portions of the conductors being housed in a plurality of boxes of electrical insulating material, a cooling fluid being supplied to the boxes at one end of the conductors and collected in boxes situated at the other end of the conductors.

According to further features of the invention as defined in the preceding paragraph, sealing means are provided for each conductor at the place where it enters the said boxes the sealing means comprising means for supplying a pressurized fluid to annular spaces between said conductor and the walls of the box, the pressure of the said fluid being greater than that of the cooling fluid.

The invention also consists in a stationary winding of a dynamo-electric machine disposed in accordance with either of the preceding two paragraphs in which each conductor is joined to a ferrule passing through a wall of a box, a small annular clearance space existing between the ferrule and the box said annular space being sealed at each end of the ferrule by sealing washers, a pressurized gas being introduced into said annular space to prevent leakage of fluid from the box along the ferrule.

The invention also consists in a winding in accordance with any of the preceding three paragraphs in which the whole winding with the boxes in position is impregnated so that the conductor ends are completely sealed with insulation.

The invention comprises dynamo-electric machines in accordance with the following description and the drawings in which:

FIGURE 1 shows end portions of the conductors of the stator of a turbo-generator, an arcuate-shaped box being shown in section;

FIGURE 2 shows an enlarged view of the box and conductor ends shown in FIGURE 1;

FIGURE 3 shows a section through the aforesaid box;

FIGURE 4 is a view of the aforesaid box looking in the direction of the arrow A in FIGURE 3;

Figure 5:
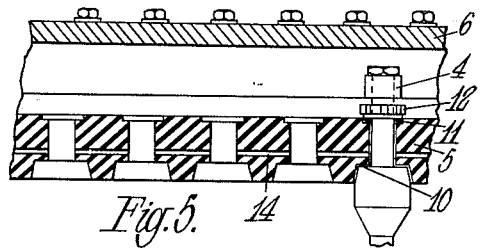
FIGURE 5 is a plan view of FIGURE 2 but showing only one conductor.

In carrying the invention into effect in the form illustrated by way of example for a turbo-generator in which the stator winding is to be cooled by distilled water and the rotor windings and rotor are to be cooled by hydrogen, and referring to FIGURE 1, the stator of the turbo-generator comprises a casing 1 in which is housed a magnetic core 2. Located in slots in the core 2 are hollow conductors 3 the ends of which are connected electrically by links 4.

Surrounding the ends of the conductors are a plurality, in the case shown six, of arcuate manifold boxes 5 made of electrical insulating material such as a cast resin of which the epoxides are an example. Each box is closed by a detachable cover plate 6 which may be of epoxy resin or of other suitable material.

The conductor ends are located and secured in the boxes by means of ferrules 7 which pass through links 4 and are held in position by a nut 7a.

The boxes are secured to the stator by means of a supporting diaphragm 8 which is attached to end cover 9 of the stator.

To prevent any leakage of the fluid from the boxes 5 at the places the conductors enter the boxes, sealing means are provided which comprise compressible sealing washers 10 and 11 situated between each ferrule and the box in the manner shown in FIGURES 2 and 5.

Each washer 11 is held in position by means of a securing nut 12.

Between the sealing washers 10 and 11 a small annular clearance space 13 is provided between the ferrule and the box and into this space pressurised hydrogen is introduced by means of ducts 14 interconnecting the spaces surrounding each ferrule. The ducts 14 are more clearly shown in FIGURES 3 and 4.

The sealing hydrogen, which is maintained at a pressure greater than that of the distilled water, is supplied to ducts 14 by means of connections 15. The connections 15 of each box are linked together by ducts 16 and are fed from a supply line 17 connected to one of the boxes.

In this way a static pressure is maintained in each of the spaces 13 to prevent the passage of any distilled water therethrough. Any hydrogen which escapes to the conductor side of the boxes mixes with the hydrogen in the alternator and consequently produces no harmful effect.

Any leakage of hydrogen into the distilled water can be harmful if allowed to collect in any appreciable quantity but as the hydrogen will tend to collect at the highest point in the distilled water system it is possible to arrange for an indicating device to give continuous indication of the quantity of hydrogen present.

Figure 6:
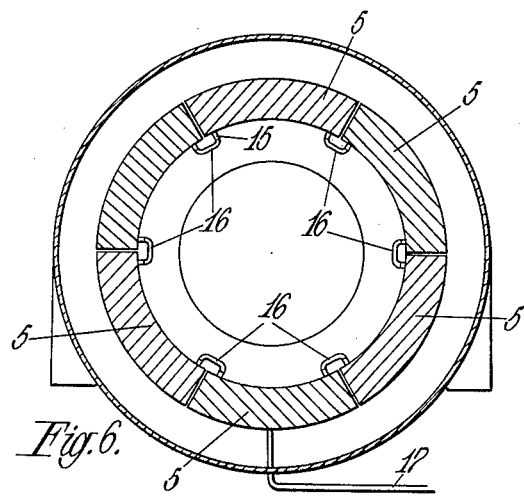
FIGURE 6 shows a system for supplying pressurized hydrogen as a sealing fluid.

FIGURE 6 shows connections for the pressurised hydrogen, a similar arrangement being at each end of the stator.

Figure 7:
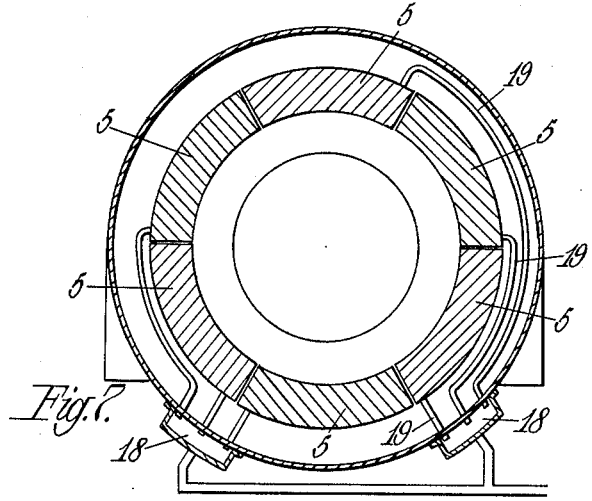
FIGURE 7 shows a system for supplying cooling liquid to the stator conductors.

The distilled water is supplied to the boxes 5 by means of the system shown in FIGURE 7. The water is supplied initially to manifolds 18 from whence it is distributed to each box by ducts or pipes 19. The water then flows through the conductors and enters a similar number of boxes at the other end of the stator from which boxes the water is collected by means of a similar system to that shown in FIGURE 7 and circulated to a heat exchanger where it gives up heat removed in the conductors before being recirculated to inlet manifolds 18. The sections may be arranged with alternate inlets and outlets at both ends of the alternator to give more uniform cooling.

Among the advantages of the invention are that the boxes 5 can be pre-cast in an epoxy resin for example and then fitted to the ends of the conductors which can be formed and completed before assembly in the stator. This avoids a multiplicity of ducts leading the cooling liquid to the conductors and at the same time gives support to the end portions of the conductors.

The increased rigidity of the system also allows the adoption of seals which are well tried in practice and which are reliable as they are less subject to the possibility of vibration due to electromagnetic forces in the windings or to other causes. In addition access is easily obtained to the conductor ends by simply removing a cover plate 6 from a box in which case one sixth of the conductors in the example illustrated are immediately accessible.

Supply of sealing hydrogen can conveniently be taken from the hydrogen supply to the alternator.

Whilst distilled water has been quoted as a cooling fluid the invention does not preclude the use of other suitable liquids such as oil or the use of a gas.

Similarly the sealing fluid may be gaseous or liquid.

A further advantage of the invention is that it allows the impregnation of the whole winding with the boxes in position and thus ensures that the conductor ends are completely sealed with insulation.

Whilst in the form illustrated the boxes are located in the alternator enclosure they can be located in the end walls of the stator so that they are accessible without the necessity of first removing the stator end covers.

Figure 8:
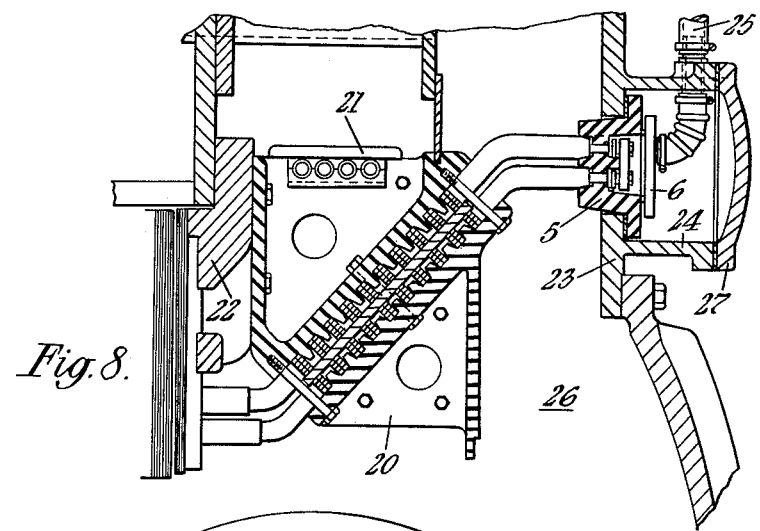
FIGURE 8 is a view in axial section of a modified arrangement.

FIGURE 8 shows an arrangement of this kind in which the conductor ends are supported in a support bracket 20 which is made in two halves bolted together along flanges one of which 21 can be seen. The support bracket is bolted to a core end plate 22.

The manifold boxes 5 are located in the end wall 23 of the stator and are surrounded in turn by arcuate explosion proof chambers formed by walls 24 formed integrally with end wall 23. The cooling fluid is led into the boxes and removed therefrom by pipes such as that indicated at 25.

The space 26 contains a cooling gas such as hydrogen.

The construction of the boxes 5 is the same as that shown in FIGURES 1-3, and access can be gained to them by removing cover plates 27 and the non-metallic cover plate 6.

Figure 9:
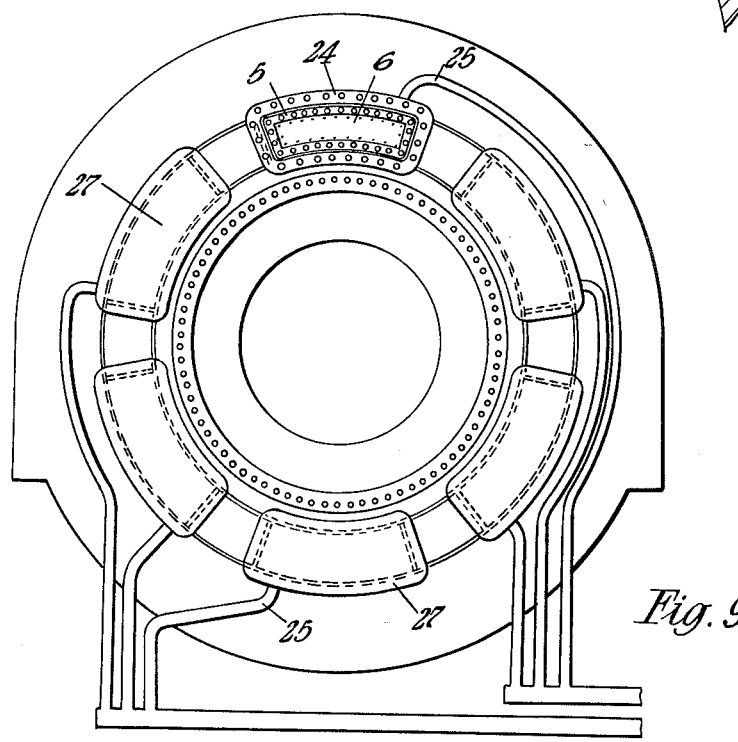
FIGURE 9 is a view in end elevation of the modified arrangement of FIGURE 8.

FIGURE 9 shows an end view of the alternator of FIGURE 8.

I claim:

1. A stationary winding of a dynamoelectric machine, which winding comprises conductors housed in slots in a stator core, end portions of the conductors extending beyond said core at each end thereof, said end portions of the conductors being housed in a plurality of boxes of electrical insulating material, a cooling fluid being supplied to the boxes at one end of the conductors and collected in boxes situated at the other end of the conductors, and sealing means are provided for each conductor at the place where it enters the said boxes the sealing means comprising means for supplying a pressurised fluid to annular spaces between said conductor and the walls of the box, the pressure of the said fluid being greater than that of the cooling fluid.

2. A stationary winding of a dynamo electric machine, which winding comprises conductors housed in slots in a stator core, end portions of the conductors extending beyond said core at each end thereof, said end portions of the conductors being housed in a plurality of boxes of electrical insulating material, a cooling fluid being supplied to the boxes at one end of the conductors and collected in boxes situated at the other end of the conductors, and in which each conductor is joined to a ferrule passing through a wall of a box, a small annular clearance space existing between the ferrule and the box said annular space being sealed at each end of the ferrule by sealing washers, a pressurised gas being introduced into said annular space to prevent leakage of fluid from the box along the ferrule.

3. A stationary winding of a dynamo electric machine, which winding comprises conductors housed in slots in a stator core, end portions of the conductors extending beyond said core at each end thereof, said end portions of the conductors being housed in a plurality of boxes of electrical insulating material, a cooling fluid being supplied to the boxes at one end of the conductors and collected in boxes situated at the other end of the conductors, and in which the whole winding with the boxes in position is impregnated so that the conductor ends are completely sealed with insulation.

4. A stator winding of a dynamo-electric machine having hollow conductors located in slots in a stator core, end portions of the conductors extending beyond said core at each end thereof, characterised in that each end of a conductor is in communication with a sealed box, each box being in communication with conductors of not more than one phase, each box having an opening therein whereby a cooling liquid may be introduced into or removed from the box such that each conductor receives cooling liquid from a box at one end of the conductor and discharges cooling liquid into a box at the other end of the conductor, and sealing means are provided for each conductor at the place where it enters the said boxes the sealing means comprising means for supplying a pressurised fluid to annular spaces between said conductor and the walls of the box, the pressure of the said fluid being greater than that of the cooling fluid.

5. A stator winding of a dynamo-electric machine having hollow conductors located in slots in a stator core, end portions of the conductors extending beyond said core at each end thereof, characterised in that each end of a conductor is in communication with a sealed box, each box being in communication with conductors of not more than one phase, each box having an opening therein whereby a cooling liquid may be introduced into or removed from the box such that each conductor receives cooling liquid from a box at one end of the conductor and discharges cooling liquid into a box at the other end of the conductor, and in which each conductor is joined to a ferrule passing through a wall of a box, a small annular clearance space existing between the ferrule and the box said annular space being sealed at each end of the ferrule by sealing washers, a pressurised gas being introduced into said annular space to prevent leakage of fluid from the box along the ferrule.

6. A stator winding of a dynamo-electric machine having hollow conductors located in slots in a stator core, end portions of the conductors extending beyond said core at each end thereof, characterised in that each end of a conductor is in communication with a sealed box, each box being in communication with conductors of not more than one phase, each box having an opening therein whereby a cooling liquid may be introduced into or removed from the box such that each conductor receives cooling liquid from a box at one end of the conductor and discharges cooling liquid into a box at the other end of the conductor and in which the whole winding with the boxes in position is impregnated so that the conductor ends are completely sealed with insulation.

References Cited in the file of this patent

UNITED STATES PATENTS

| | | |
|---|---|---|
| 1,285,398 | Rudenberg | Nov. 19, 1918 |
| 1,451,577 | Jantzen | Apr. 10, 1923 |
| 1,499,411 | Schroeder | July 1, 1924 |
| 2,695,368 | Kilbourne | Nov. 23, 1954 |
| 2,722,616 | Moses | Nov. 1, 1955 |
| 2,727,161 | Kilner | Dec. 13, 1955 |

FOREIGN PATENTS

| | | |
|---|---|---|
| 83,177 | Austria | Mar. 10, 1921 |
| 557,216 | Great Britain | Nov. 10, 1943 |